(No Model.)   2 Sheets—Sheet 1.

H. H. FERRY.
CURD STIRRING MACHINE.

No. 288,785.   Patented Nov. 20, 1883.

Witnesses:
Edmond Brodhag
T. C. Huntemann

Inventor:
Harlow H. Ferry
by Johnson & Johnson
Attys (No Model.) 2 Sheets—Sheet 2.
H. H. FERRY.
CURD STIRRING MACHINE.
No. 288,785. Patented Nov. 20, 1883.
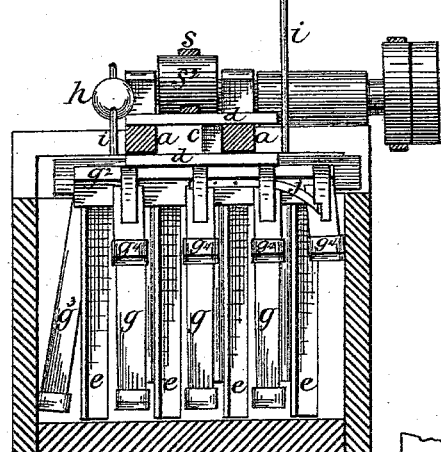
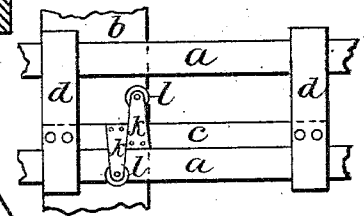
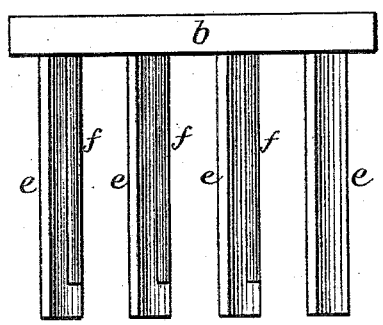
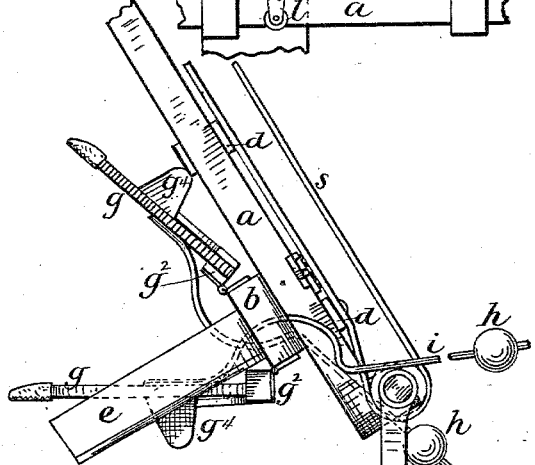
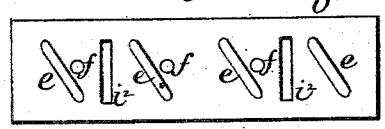
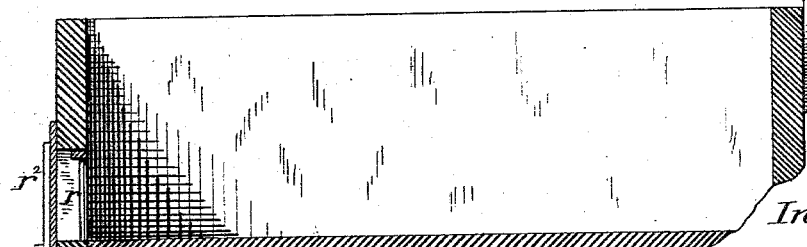
Witnesses:
Edmond Brodhag
T. C. Hunteman
Inventor:
Harlow H. Ferry
by Johnson and Johnson
Attys.

UNITED STATES PATENT OFFICE.

HARLOW H. FERRY, OF KINGSVILLE, OHIO.

CURD-STIRRING MACHINE.

SPECIFICATION forming part of Letters Patent No. 288,785, dated November 20, 1883.

Application filed January 29, 1883. (No model.)

*To all whom it may concern:*

Be it known that I, HARLOW H. FERRY, a citizen of the United States, residing at Kingsville, in the county of Ashtabula and State of Ohio, have invented new and useful Improvements in Curd-Stirring Machines, of which the following is a specification.

My invention relates to the preparation of curd in the art of making cheese, the objects being to stir and break up the curd, prevent it from caking in lumps, and render it of uniform texture, in the operation of separating the whey from the curd, and preparing the curd for the process of completing the cheese. Apparatus by which these objects are effected is illustrated in the accompanying drawings and will be hereinafter fully described, and my improvement specifically designated in the devices and combinations of parts claimed as my invention.

Figure 1:
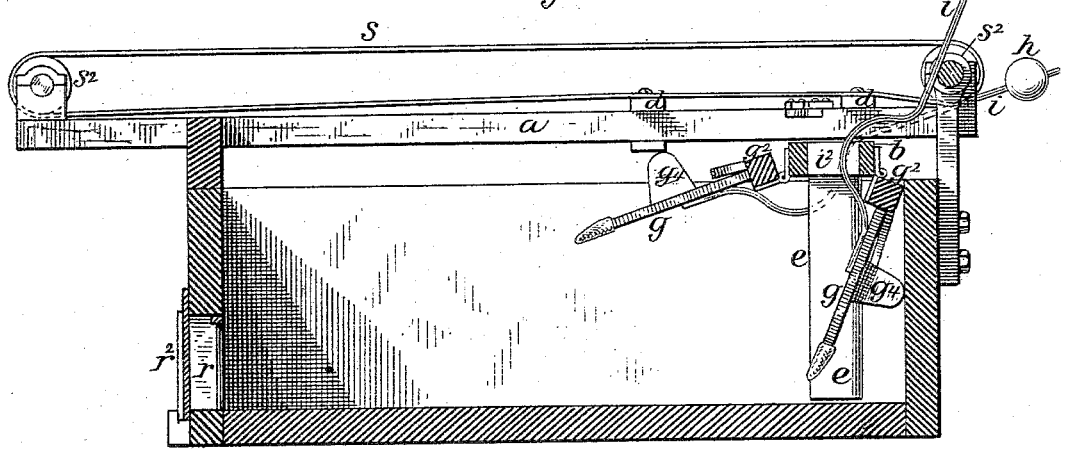
Figure 2:
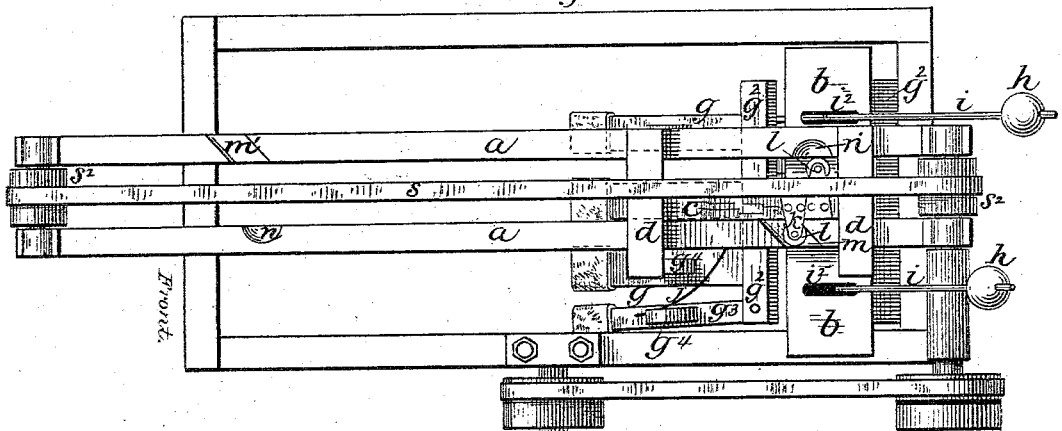
Figure 3:
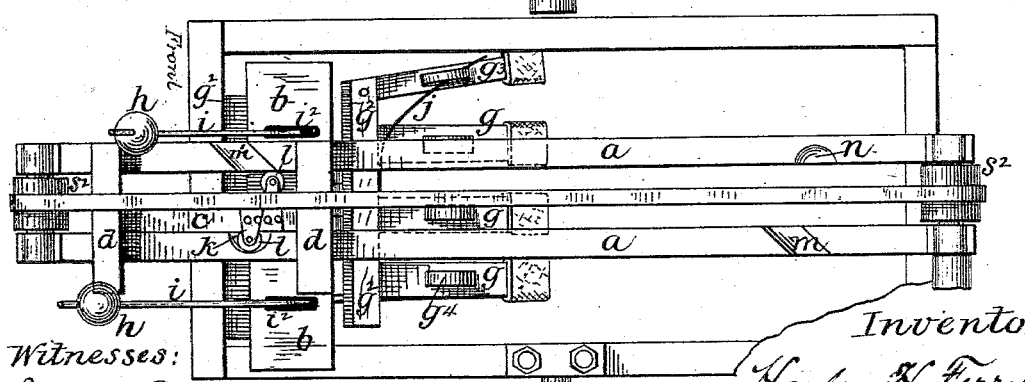

Referring to the accompanying drawings, Figure 1 represents a vertical longitudinal section of my improved curd-preparing apparatus, showing the longitudinally-traversing breaking, stirring, and leveling devices at the end of their movement in one direction in the vat; Fig. 2, a top view of the same, showing the stirring devices in position to be shifted to the left, to travel back in a different path; Fig. 3, a similar view, showing the stirring devices at the other end of the vat in position shifted to the right; Fig. 4, a transverse section of the machine. Fig. 5 shows a side view of the stirring-blades; Fig. 6, a bottom view of the same; Fig. 7, a detail of the sliding cross-head; and Fig. 8, a sectional view, showing the ways turned up to remove the operating devices from the vat.

The vat is oblong, and is constructed in any suitable manner to effect the proper cooking and curding of the milk and the separation of the whey. The stirring and breaking devices are caused to pass through the curd from end to end of the vat, and to change their path in the curd at the end of each back and forward movement. These devices are of the simplest construction, and are caused to traverse the vat and to be shifted laterally upon two parallel horizontal ways, $a\,a$, placed longitudinally and centrally upon the vat about six inches apart. These carrying-ways are preferably wooden beams hinged to one end of the vat, to allow them to be turned up endwise over the end of the vat, to remove the preparing devices for the removal of the cheese-curd to be treated in the process of finishing the cheese. At the other end the ways extend beyond the vat, to accommodate the movement of the carriage of the traversing devices. This carriage consists of a cross-head, $b$, placed beneath the ways and traveling in contact with their under side. It is suspended from the ways by a short three-inch square slide, $c$, placed between the ways, and by cross-bars $d$, connected with the ends of said slide. This slide is fixed to and travels with the cross-head, and is provided with means which cooperate with means on the ways to shift the cross-head and its depending devices laterally within the vat, as will be presently more particularly stated. The cross-head carries a gang of blades, $e$, extending down so as to just clear the bottom of the vat, and set obliquely to their path a suitable distance apart. By the side of each blade a rod, $f$, depends to about on a level with the curd. The function of these blades is to stir and break up the curd and separate the whey, while the rods serve as levellers for the curd. To each side of the cross-head is hinged a gang of slats, $g$, connected to a bar, $g^2$, and extending like fingers in downwardly-inclined positions from the cross-head in such relation to its oblique blades $e$ as to pass between them when turned down. These hinged slats are maintained in their inclined positions by weights $h$ on the upper ends of rods $i$, which, being attached to the slats, are bent so as to pass up through cross-slots $i^2$ in the cross-head $b$, and rest upon the ends of said slots, so as to keep the lower ends of the slats above the surface of the curd until they strike the end of the vat. These weights are arranged outside of the ways, and one is sufficient for each gang of slats. Other equivalent means may be used for holding the slats in proper positions.

The outside slat, $g^3$, on the right hand of one gang and on the left hand of the other are pivoted to the hinge-bar $g^2$, and are constantly pressed outward against the sides of the vat by a spring, $j$, attached to the hinge-bar. The slats $g\,g^3$ are to prevent the curd from banking at the ends of the vat by the action of the oblique blades, because as the latter approach either end of the vat the ends of the hinged slats strike against the inner wall and are thereby depressed, and by means of the blocks $g^4$, which come in contact with the wall as the slats are borne down, and the weight $h$, which is thereby elevated and thrown over, the lower ends of the slats are caused to swing through between the blades and throw the curd away from the end of the vat through the spaces between the blades, in position to be broken and leveled by the return movement of the blades. The function of the pivoted end blades is to keep the corners of the vat from being caked with the curd, as they pass into the corners and clean them out. This function of the end slats is especially important, because the oblique position of the blades tends to drift the curd to that side of the vat at which these pivoted cleaning-slats are arranged, and therefore they are held in position to act in the corners of the vat.

As stated, the blades are caused to pass through the curd and break it up in furrows; but were they only caused to travel in the same path back and forth, they would fail to properly break up and reduce the curd to a uniform condition. Therefore I provide for shifting the breakers at each end of their longitudinal movements, so as to cause them to return in a different path, splitting the furrows previously made, and thus give a uniform breaking and stirring to the curd. This lateral shifting is effected by providing the horizontal slide $c$ with arms $k$, attached to and projecting at right angles from the top thereof, and carrying anti-friction rolls $l$ at their ends. The length of these arms is just sufficient to cause the roll of one to travel against the inner side of one of the beamways $a$, while the slide travels against the inner side of the other way, with the other roll moving over the top of the way, thus holding the cross-head secure in the travel of the blades in either direction. The cross-head having reached the end of the vat, and the slats performed their function in throwing the curd back from the end, the roll which had moved over the top of the way drops into an oblique recess, $m$, in the top thereof, and the return movement of the cross-head brings the roll against the oblique shoulder of said recess, and forces the slide, its connected cross-head, and the oblique blades depending therefrom over sidewise in the vat, the roll passing from the oblique shoulder onto the inner side of the way, while the slide is brought in contact with the inner side of the other way, and the non-acting roll passes by a depression, $n$, over the top of said way, thus shifting the breakers from the right to the left a distance equal to the space between the beams. At the end of the movement down the left side of the ways, the shifting action to the right is effected in the same way by the oblique shoulder of the recess $m'$ in the way and the roll carried by the slide. In this laterally-shifting movement the pivoted end slats yield, so that while they move in contact with the sides of the vat they do not interfere with the shifting of the blades from right to left, and vice versa.

One end of the vat is provided with a strainer, $r$, for drawing off the whey by a suitable gate or slide, $r^2$, and in connection with this strainer the hinged slats serve the important purpose of keeping it from being choked and closed by the curd, as the slats pass down and clean the curd away from the strainer. The lower ends of the slats are padded, to cause them to move easily over the ends of the vat and the strainer, and to handle the curd carefully.

Any suitable means may be provided for operating the carriage longitudinally. I have shown an endless cord or band, $s$, attached to one of the cross-bars of the slide, and passed over a drum, $s^2$, mounted in each end of the ways. One of the drums has a fast and a loose pulley, and is operated by any suitable shifting motion, in which the cross-head operates the shifting device at the end of each movement of the breakers or stirrers.

It will be understood that the clearing function of the slats is rendered automatic by contact with each end of the vat, and the resumption of their normal or inclined positions above the curd is effected by the resistance of the curd in the return movements of the sliding carriage and the action of the weight.

The curd-stirring devices and their supporting and guiding appliances may be removed from the vat in any suitable way. As shown, this is done by hinging the longitudinal ways upon the shaft of the driving-drum, so that they may be turned up out of the way without interfering with the driving-belt.

The machine is put in operation immediately after the curd is cut and prepares it for the press. The vat is inclined when the curd is cooked and the whey is to be drawn off, the inclined position allowing the whey to run more freely and to facilitate draining the curd as dry as can be. In this operation the rods operate as levelers by being set near the middle of the blades, so that when the blades are traveling up the incline the rods are in the current between the blades, and co-operate with them in carrying some of the curd from the lower end of the vat up the incline, and leave it in the upper part of the vat, where the curd is not so deep. On the return movement of the blades down the vat, the rods, being behind the blades, do not carry any curd back with them. The action of the blades in their back and forth movements in different paths assists in draining the whey very quickly from the curd, as in their movement up the incline they do not take any whey with them, and returning they leave open spaces behind them, in which the whey follows to the lower end of the vat, thus allowing a perfect drainage.

I claim—

1. In apparatus for preparing curd in the art of making cheese, the combination of the parallel ways, the cross-head, and the depending curd-stirring devices carried thereby, with means for reciprocating the cross-head and its depending stirrers in a longitudinal plane, and means for laterally shifting said cross-head and its depending stirring devices at each end of their travel, and thereby reciprocating the stirrers in different longitudinal paths within the curd, substantially as described, for the purpose specified.

2. In combination, in apparatus for preparing curd in cheese-making, the horizontal ways *a a*, provided with oblique shouldered recesses *m m'*, the horizontal reciprocating carriage *b*, carrying the stirring devices, provided with a slide-bar, *c*, operating between said ways, and the rolls carried by said slide-bar, operating between the ways and within their oblique shouldered recesses, whereby to effect the lateral shifting of the curd-stirring devices at the end of their reciprocating travel in each direction, substantially as described, for the purpose specified.

3. The combination, in apparatus for preparing curd in cheese-making, of a horizontal reciprocating carriage supporting depending breaking devices, the horizontal ways for supporting said carriage, and the vat supporting said ways, with slats hinged to each side of said carriage, adapted for automatic operation at the end of its travel in each direction, and means, substantially such as described, whereby said carriage is shifted laterally at each end of the vat, for the purpose specified.

4. In apparatus for preparing curd in cheese-making, the combination, with the vat for containing the curd, provided with a strainer at one end, and the reciprocating carriage for the curd-breaking devices, of means carried by the carriage and controlled by the ways, substantially such as described, for shifting said carriage laterally at each end of the vat, and a gang of slats hinged to and carried on each side of the curd-breaking devices having the pivoted end slats, the springs bearing against said slats, and the weights attached to said gangs of slats, all adapted for operation substantially as described, for the purpose specified.

5. In apparatus for preparing curd in cheese-making, a gang of blades depending from a horizontal reciprocating carriage, placed in oblique relation to each other, in combination with means for supporting and reciprocating them, and means for shifting them laterally at the ends of the vat.

6. The combination, in apparatus for preparing curd in cheese-making, of a gang of blades depending in oblique relation to each other from opposite sides of a horizontal reciprocating carriage, with rods depending between said blades, means whereby said carriage is supported and reciprocated, and means whereby it is automatically shifted laterally at the ends of the vat, substantially as described, for the purpose specified.

In testimony whereof I have hereunto set my hand in the presence of two subscribing witnesses.

HARLOW H. FERRY.

Witnesses:
DIANA L. FERRY,
SEXTUS SLOAN.